July 22, 1941. J. McARTHUR 2,249,770
FISH LURE
Filed July 26, 1939
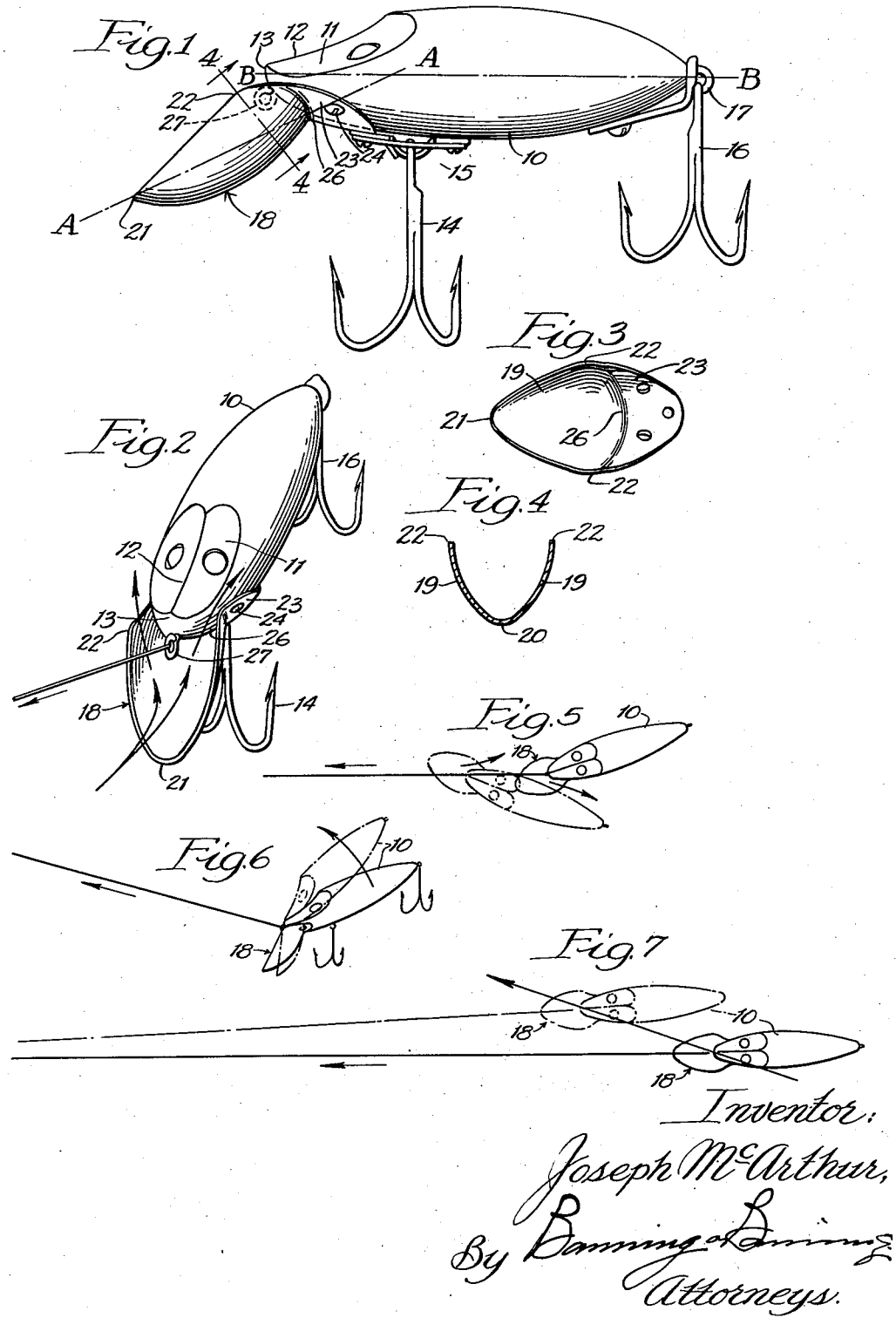
Inventor:
Joseph McArthur,
By Banning & Banning
Attorneys.

Patented July 22, 1941

2,249,770

UNITED STATES PATENT OFFICE 2,249,770

FISH LURE

Joseph McArthur, Dowagiac, Mich., assignor to James Heddon's Sons, Dowagiac, Mich., a corporation of Michigan Application July 26, 1939, Serial No. 286,663

12 Claims. (Cl. 43—46)

The fish lure of the present invention is designed as a deep diving lure which when drawn through the water will maintain a constant vibratory or wiggling motion interspersed at irregular intervals by rolling and erratic lateral darting movements in simulation of the movements of a live minnow.

The distinctive feature of the present lure lies in the provision of a channeled spoon secured to the body of the lure at the forward end thereof and extending downwardly and forwardly from below the nose of the lure, and so configured as to normally direct the currents of water backwardly against the nose of the lure, or other obstructing element, which when the same is traveling forward in an erratic manner provides a medial obstruction and causes the water currents to variably divide and flow around the head and on either side of the body, while the deep side walls of the spoon, when the body darts or rolls on its side, provide enough frontal resistance to cause the bait to continue its constant wiggling movements when the bait is darting from side to side.

While it is well understood that many forms of lures have employed a depending resistance element for the purpose of impinging against the water in some manner, repeated experiments have shown that the special formation of the spoon which is employed in connection with the present invention imparts a singularly effective movement to the lure which it is impossible to obtain with lip structures of essentially different form, or secured to the body in an essentially different manner.

Further objects and details will appear from the description of the invention in conjunction with the accompanying drawing, wherein—

Figure 1 is a side elevation of the lure of the present invention;

Fig. 2 is a perspective view toward the front of the lure when in diving position;

Fig. 3 is a plan view of the spoon detached;

Fig. 4 is a sectional view taken on line 4—4 of Fig. 1; and

Figs. 5, 6 and 7 are diagrammatic views illustrating the action of the bait under varying conditions.

The lure of the present invention comprises a body 10 so shaped as to resemble a minnow, which body may be made of a suitable composition and hollow, so that in the absence of the metallic connections or fittings to be presently described the body would be buoyant. However, with the added weight of the metallic connections, the body will normally submerge, being slightly heavier than the displaced volume of water. It is not intended to limit the invention to a hollow composition bait which sinks when at rest, or to one having any particular degree of buoyancy, since the features of this invention are applicable to bait bodies of varying material but of the general configuration shown.

The head of the body in the form shown by way of example is slightly dished or flattened as at 11 on each side, which dished portions merge into a center ridge 12 terminating at its forward end in an abrupt nose 13 which rounds downwardly from the tip of the ridge and into the under side of the body. Save for the head configuration, the body is of smoothly rounded oval formation and configured to resemble the tapered end of a stubby cigar. The special dished form of the head, however, is not regarded as essential.

In the form shown the body is provided with the usual forward gang of hooks 14 secured by a suitable fitting 15 to the under side of the body near the head thereof, and the body is also provided with a rear gang 16 secured by a suitable fitting 17 to the rear end of the lure.

The special feature of the present invention which controls the action of the lure consists in the provision of a deeply channeled spoon 18 of special or unique configuration so formed and connected to the body as to impart thereto the peculiar combination of movements which distinguish the present lure. The spoon is of much greater length than lips commonly employed in connection with lures, and projects forwardly and downwardly beyond the nose of the bait to a much greater degree than is the common practice in the provision of resistance plates or lips at the forward end of a bait. As shown, the length of the effective portion of the spoon in advance of its line of juncture under the nose of the lure is in excess of two-fifths of the length of the body, and the spoon extends obliquely downwardly from the body at a sharply pitched angle of about thirty degrees measured from end to end of the base or floor of the spoon. The angle in question is that subtended between the line AA and the longitudinal axis BB of the lure body.

The spoon is of deeply dished formation transversely and to a lesser extent longitudinally, being of trough shape in cross section as indicated in Fig. 4, with rounded side walls 19 merging into the base or floor 20, and with the upper marginal portions of the side walls rounding up to planes which are substantially or virtually parallel and greatly in excess of 45° to the horizontal longitudinal plane of the bait body. In short, the upper margins of the walls approach the vertical position, as shown, and from this point the walls curve downwardly and converge at a progressively greater angle toward one another until they merge together at the base of the trough like spoon. It will be noted, however, that since the upper marginal portions are substantially parallel to one another, the angle of convergence at this point is practically zero in the form shown, and in no event should the angle of convergence of the upper portions toward one another be greater than 90°, which is desirable in order to afford a surface of impact for the water even when the bait rolls through a considerable range from one side to the other on its longitudinal axis. The spoon is also dished longitudinally to a considerable degree, so that with the bait standing level as in Fig. 1 the floor of the spoon at its forward end will lie in substantially horizontal plane and progress therefrom upwardly and rearwardly until at the line of connection with the lure body it follows an angle of almost forty-five degrees with respect to the longitudinal axis of the body.

The spoon at its forward end terminates in a narrowly rounded tip 21 resembling in shape the tip of a pointed table spoon, and from this point the side walls of the trough-shaped lip progressively increase in height and in an oblique plane up to the crest 22 on each side, which is the line on which the section of Fig. 4 is taken. To the rear of the crest the side walls narrow down and the spoon terminates in an angularly disposed tongue 23 which closely embraces the under side of the head at the base of the nose and on each side thereof, being connected thereto by screws 24. The depth of the spoon in the transverse plane 4—4 through the crests is considerably greater than one-half the spread of the walls in the same plane and greater than one-third the length of the spoon measured from its tip to the line of juncture with the body.

The curvature of the rear end of the spoon at the point 26 conforms closely to the curvature of the under side of the head at the base of the nose, so that at this point the spoon fits snugly and tightly around the under side of the head, so that there can be no escape of water except as it flows up and around the nose of the bait or over the sides of the spoon in greater or less degree, when the lure rolls or is angled to one side or the other away from its medial line of advance.

It will be observed that the under side of the nose, represented by the extreme forward end of the lure body, projects forwardly and upwardly within the confines of the side walls of the spoon, so that the under side of the nose serves as a forwardly projecting overlying dam or obstruction which normally serves to divide the water currents and direct them rearwardly and upwardly on either side of the nose and over the dished surfaces 11, although when the bait body rolls on its side or assumes an angular position with relation to the line of draft as it tends to dart from side to side, one or the other of the deep side walls of the spoon will afford a frontal resistance to the flow of the water, so that the lure will dart sidewise in an erratic manner while continuing its wiggling motions, which combination of movements is particularly effective in the luring of game fish.

The lure is provided with a line tie 27 which is located at a point below the tip of the nose 13 and below and within the confines of the side walls of the spoon so that the fulcrum point upon which the lure body moves is slightly below the longitudinal axis of the bait but above and in advance of the line of juncture 26 between the rear end of the lip and the under side of the head.

The spoon is formed of thin sheet metal, and its projection forwardly to a substantial degree beyond the forward end of the body increases the weight and leverage at the forward end of the lure, causing it to dip downwardly when at rest and irrespective of the water resistance encountered in retrieving the bait or drawing it through the water.

In use, when at rest, the lure will assume a downwardly tilted position but when being retrieved the lure will dive deeply by reason of the very substantial water resistance afforded by the spoon, as indicated in Fig. 6. The extent of the diving movements is of course variable, depending upon the speed of advance of the lure, and in addition to the diving movements the lure body will be subjected to a constant wiggling and/or darting movement occasioned by slight variations in the water flow through and over the spoon and around the nose of the bait body.

The particular formation of the spoon has been found extremely effective in producing the combination of movements above described, but it has also been found that any substantial departure or variation from the configuration as shown will seriously impair or destroy the intended effect, which is due primarily to the deep dishing of the spoon and its deep trough-shaped walls in conjunction with a dam or impediment which in the present instance is afforded by the front of the head, but which might otherwise be afforded, and which effects the division and diversion of the water flow in the manner described.

It is realized that in the designing of fish lures a number of variable factors must be taken into account in seeking to secure a particular motion or action of the lure in the water, and since these variable factors are difficult of exact determination, and are balanced against one another under constantly varying conditions, it becomes difficult or impossible in advance to foretell just what mechanical results will follow from a given set of conditions, but it is believed that the description above given regarding the effect of the water in varying the action of the lure is substantially correct, and experience has shown that any substantial variation in the configuration and location of the present channeled spoon will materially impair its operation, so that it is not the intention to claim broadly the use of a lip or the like located at or near the forward end of the lure body, but only to claim a spoon of substantially the configuration here shown and located with relation to the body in substantially the manner above described, or in an equivalent manner which regulates the flow of the water in a manner consistent with the principles of the present invention.

I claim:

1. In a fish lure, a body of substantially stubby cigar shape, a spoon of generally trough shaped formation dished longitudinally and transversely and having side walls upwardly extending to afford a deep water channel, said spoon extending obliquely forwardly and downwardly from the under side of the head and projecting in the main in advance of the tip thereof and secured at its rear end closely around the under side of the head along a line to the rear of the tip of the head, the tip of the head lying midway of the rear ends of the side walls of the spoon and serving in conjunction therewith as an abutment to divide the water flow through the spoon and direct the same laterally, the spoon from its forward end to its point of juncture with the under side of the head being in length not less than two-fifths of the length of the body measured from the tip of the head to the rear terminus, and a line tie secured to the head.

2. In a fish lure, a body of substantially stubby cigar shape, a spoon of generally trough shaped formation dished slightly longitudinally and to a greater extent transversely and having its side walls upwardly extending to afford a deep water channel, said spoon extending obliquely forwardwardly and downwardly from the under side of the head and projecting in the main in advance of the tip thereof at an angle of approximately thirty degrees as measured from the longitudinal axis of the lure body and secured at its rear end closely around the under side of the head along a line to the rear of the tip of the head, the tip of the head lying midway of the rear ends of the side walls of the spoon and serving in conjunction therewith as an abutment to divide the water flow laterally, the spoon from its forward end to its point of juncture with the under side of the head being in length not less than two-fifths of the length of the body measured from the tip of the head to the rear terminus, and a line tie secured to the head at a point below the longitudinal axis of the body.

3. In a fish lure, the combination of a body and a trough-like spoon secured to the forward portion of the body and extending obliquely forwardly and downwardly from its line of juncture with the body, the depth of said spoon measured on the transverse plane of greatest depth being not less than one-half the spread of the side walls within said plane.

4. In a fish lure, the combination of a body and a trough-like spoon secured to the forward portion of the body and extending obliquely forwardly and downwardly from its line of juncture with the body, the depth of said spoon measured on the transverse plane of greatest depth being not less than one-half the spread of the side walls within said plane, and the upper marginal portions of said side walls within the same plane converging downwardly toward one another at an angle of less than 90°, and the spoon progressively decreasing in depth and spread from said plane forwardly to the end of the spoon.

5. In a fish lure, the combination of a body and a trough-like spoon secured to and embracing the forward under portion of the body and extending obliquely forwardly and downwardly from its line of juncture with the body, the walls on each side rearwardly from the tip progressively increasing in height back to crests defining the maximum depth of the spoon, and the upper marginal portions of the side walls at the crests converging downwardly toward one another at an angle of less than 90°.

6. In a fish lure, the combination of a body and a trough-like spoon secured to the forward portion of the body and extending obliquely forwardly and downwardly from its line of juncture with the body, said spoon terminating at its forward end in a relatively narrow tip and the walls on each side diverging rearwardly from the tip and progressively increasing in height and in spread between the edges back to crests defining the maximum depth of the spoon, the depth of the spoon on the transverse plane through the wall crests being not less than one-half the spread of the walls measured within the same plane.

7. In a fish lure, the combination of a body and a trough-like spoon secured to the forward portion of the body and extending obliquely forwardly and downwardly from its line of juncture with the body, said spoon terminating at its forward end in a relatively narrow tip and the walls on each side diverging rearwardly from the tip and progressively increasing in height and in spread between the edges back to crests defining the maximum depth of the spoon, the depth of the spoon on the transverse plane through the wall crests being not less than one-half the spread of the walls measured within the same plane and not less than one-third the length of the spoon measured from the tip to the line of juncture with the bait body.

8. In a fish lure, the combination of a body of generally ovate formation and a spoon or actuating device secured to the forward portion of the body and extending obliquely forwardly and downwardly therefrom, said spoon being of elongated trough-shaped formation dished fore and aft and transversely in its base which rounds up forwardly to a narrow tip, the side walls rearwardly of the tip progressively increasing in height and in spread to their crests in the medial region of greatest depth and width, and the upper portions of said walls in said medial region rounding up to an angular relation of less than 90° to one another in their marginal portions.

9. In a fish lure, the combination of a body of generally ovate formation and a spoon or actuating device secured to the forward portion of the body and extending obliquely forwardly and downwardly therefrom, said spoon being of elongated trough-shaped formation dished fore and aft and transversely in its base which rounds up forwardly to a narrow tip, the side walls rearwardly of the tip progressively increasing in height and in spread to their crests in the medial region of greatest depth and width, the maximum depth of the spoon in the medial region being not less than one-half the spread of the margins of the side walls in the same region.

10. In a fish lure, the combination of a body of generally ovate formation and a spoon or actuating device secured to the forward portion of the body and extending obliquely forwardly and downwardly therefrom, said spoon being of elongated trough-shaped formation dished fore and aft and transversely in its base which rounds up forwardly to a narrow tip, the side walls rearwardly of the tip progressively increasing in height and in spread to their crests in the medial region of greatest depth and width, and the upper portions of said medial region rounding up to an angular relation of less than 90° to one another in their marginal portions, the maximum depth of the spoon in the medial region being not less than one-half the spread of the margins of the side walls in the same region.

11. In a fish lure, the combination of a body of generally ovate formation and a spoon or actuating device secured to the forward portion of the body and extending obliquely forwardly and downwardly therefrom, said spoon being of elongated trough-shaped formation dished fore and aft transversely in its base which rounds up forwardly to a narrow tip, the side walls rearwardly of the tip progressively increasing in height and in spread to their crests in the medial region of greatest depth and width, and the upper portion of said walls in said medial region rounding up to an angular relation of less than 90° to one another in their marginal portions, the maximum depth of the spoon in the medial region being not less than one-half the spread of the margins of the side walls in the same region, and the edges of the side walls in advance of the crests sloping downwardly to the tip in an obliquely disposed plane.

12. In a fish lure, the combination of a body of generally ovate formation and a spoon or actuating device secured to the forward portion of the body and extending obliquely forwardly and downwardly therefrom, said spoon being of elongated trough-shaped formation dished fore and aft and transversely in its base which rounds up forwardly to a narrow tip, the side walls rearwardly of the tip progressively increasing in height and in spread to their crests in the medial region of greatest depth and width, and the upper portions of said walls in said medial region rounding up to an angular relation of less than 90° to one another in their marginal portions, the maximum depth of the spoon in the medial region being not less than one-half the spread of the margins of the side walls in the same region, the forward end of the body extending forwardly beyond the line of juncture of the spoon and between the side walls thereof.

JOSEPH McARTHUR.